UNITED STATES PATENT OFFICE.

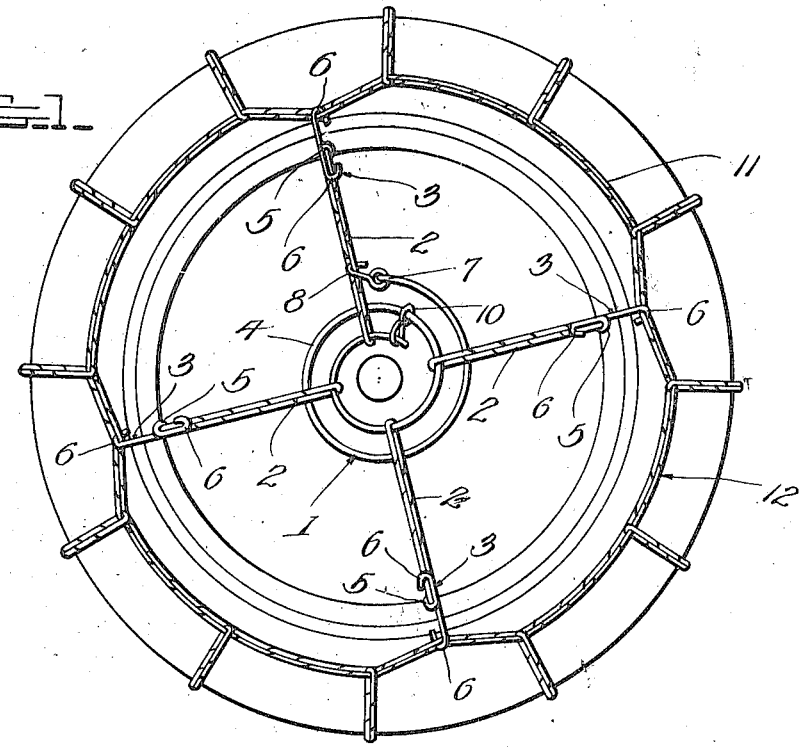
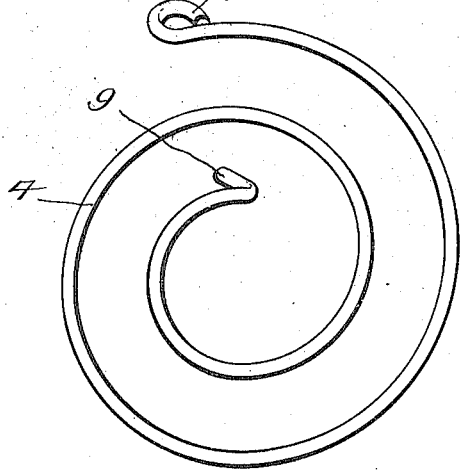
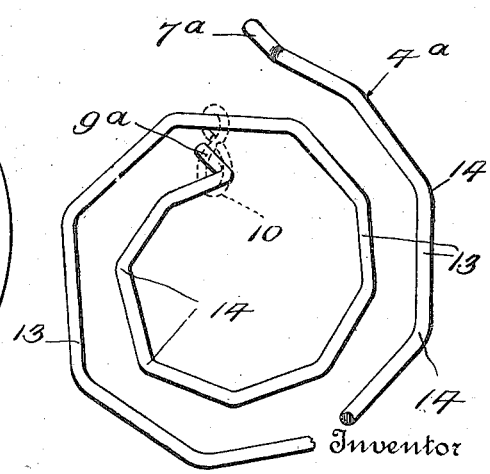

WILLIAM I. HARP, OF GALAX, VIRGINIA, ASSIGNOR OF ONE-HALF TO CHARLES P. WAUGH, OF GALAX, VIRGINIA.

TIRE-CHAIN TIGHTENER.

1,221,173.  Specification of Letters Patent.  Patented Apr. 3, 1917.

Application filed September 25, 1916. Serial No. 122,095.

*To all whom it may concern:*

Be it known that I, WILLIAM I. HARP, a citizen of the United States, residing at Galax, in the county of Grayson and State of Virginia, have invented certain new and useful Improvements in Tire-Chain Tighteners; and I do declare the following to be a full, clear, and exact description of the invention, such as will enable others skilled in the art to which it appertains to make and use the same.

My invention aims to provide a simple and inexpensive tightener for automobile tire chains and to this end I employ a plurality of radially extending chains to be connected at their outer ends with the side members of the tire chains, and provide a spiral formed of a single rod for pulling said radial chains inwardly and holding them under tension.

In the accompanying drawings:

Figure 1 is a side elevation of one type of the tightener applied to a tire chain;

Fig. 2 is a perspective view of the tightener shown in Fig. 1;

Fig. 3 is a perspective view of another form of spiral.

In Figs. 1 and 2 the numeral 1 designates the improved tightener which consists primarily of radial chains or the like 2 having hooks 3 at their outer ends, and a spiral 4 formed of a single resilient rod and passed through the innermost links of said chains.

The hooks 3 are preferably double-ended as shown, being each formed of a single piece of wire having a single coil 5 between its ends and having said ends bent substantially upon themselves as shown at 6 to form hooks proper for engagement with the side members of a tire chain. It is to the coils or eyes 5 that the outer ends of the chains 2 are connected and said coils or eyes are located nearer to one end of the hooks 3 than to the other end thereof, thus rendering the device applicable to tire chains of different sizes.

The outer end of the spiral 4 is bent upon itself to form an eye 7 by means of which an anchor hook 8 is pivoted to said spiral for holding the latter after once adjusted to draw the chains 2 inwardly. The inner end of spiral 4 is bent laterally at 9 and serves as a stop to hold an S-link 10 against movement from this end of said spiral, said link thus preventing the chains 2 from becoming detached as will be clear from Fig. 2, the link in question having its opposite ends slidably mounted on adjacent convolutions of the spiral.

In use, the hooks 3 will be engaged with the outer side member 11 of a tire chain 12, the chains 2 being then on the outer convolution of the spiral 4. The spiral will now be rotated so as to cause the chains in question to be drawn inwardly as shown in Fig. 1 and this having been done, the hook 8 will be engaged with one of the chains 2 to hold the spiral against retrograde movement.

In Fig. 3 the spiral $4^a$ is bent laterally at its inner and outer ends as shown respectively at $9^a$ and $7^a$ and an S-link 10 is employed as in the form previously described, the hook 8 being eliminated in this form of the invention since the convolutions of $4^a$ are formed of a plurality of straight portions 13 which join each other at obtuse angles 14, the latter constituting seats in which the inner ends of the chains 2 are received, said seats serving to prevent rotation of the spiral $4^a$ after it has been tightened.

Either type of the invention will be efficient and durable and may be inexpensively manufactured and marketed. For these reasons, the features of construction shown constitute the preferred forms of the device but it is to be understood that within the scope of the invention as claimed, numerous changes may be made without sacrificing the principal advantages thereof.

I claim:

1. A tire chain tightener comprising a plurality of radial members for engagement at their outer ends with the side of said chain, and a spiral formed of a single resilient rod passing through the inner ends of said radial members to be turned in one direction for drawing said members inwardly and holding them under tension.

2. A tire chain tightener comprising a plurality of radial members for engagement at their outer ends with the side of said chain, a spiral formed of a single resilient rod passing through the inner ends of said radial members to be turned in one direction for drawing said members inwardly and holding them under tension, a link having its ends slidably mounted on two adjacent convolutions of the spiral, and stop means on both ends of said spiral for preventing said link from moving therefrom, said link serving to prevent the radial members from becoming detached from the spiral.

In testimony whereof I have hereunto set my hand in the presence of two subscribing witnesses.

WILLIAM I. HARP.

Witnesses:
JOEL HARMAN,
S. E. WILKINSON.